APPARATUS FOR CUTTING MODULE RISER WIRES

Filed Jan. 18, 1956 5 Sheets-Sheet 1

Clifford R. Walker
*INVENTOR.*

Dec. 29, 1959 C. R. WALKER 2,918,836

APPARATUS FOR CUTTING MODULE RISER WIRES

Filed Jan. 18, 1956 5 Sheets-Sheet 2

Clifford R. Walker
*INVENTOR.*

APPARATUS FOR CUTTING MODULE RISER WIRES

Filed Jan. 18, 1956 5 Sheets-Sheet 3

Clifford R. Walker
*INVENTOR.*

APPARATUS FOR CUTTING MODULE RISER WIRES

Filed Jan. 18, 1956 5 Sheets-Sheet 4

Clifford R. Walker
*INVENTOR.*

| INDENT | BLADE | WIRE |
|---|---|---|
| $I_1$ | $B_1$ | $W_1$ |
| $I_2$ | $B_1$ | $W_2$ |
| $I_3$ | $B_1, B_2$ | $W_1, W_3$ |
| $I_4$ | $B_2, B_3$ | $W_1, W_2$ |
| $I_5$ | $B_2, B_3, B_4$ | $W_1, W_2, W_3$ |
| $I_6$ | $B_3, B_4$ | $W_2, W_3$ |
| $I_7$ | $B_4$ | $W_3$ |
| $I_8$ | 0 | 0 |

Clifford R. Walker
*INVENTOR.*

United States Patent Office 2,918,836

Patented Dec. 29, 1959

2,918,836

APPARATUS FOR CUTTING MODULE RISER WIRES

Clifford R. Walker, Dracut, Mass., assignor to Sanders Associates, Inc., Nashua, N.H., a corporation of Delaware Application January 18, 1956, Serial No. 559,853

6 Claims. (Cl. 83—563)

The present invention relates generally to devices for manufacturing electrical and electronic components, and, more particularly, for manufacturing modules. More specifically, the invention relates to an apparatus for cutting the riser wires of modules.

Electronic circuitry and wiring has become so intricate that a great deal of attention has been directed to the problem of its automatic manufacture. A recent innovation in this regard is the development of electronic circuit building blocks or modules which are particularly adapted to automatic manufacture. Such a module is described in an article entitled "Project Tinkertoy," National Bureau of Standards Technical News Bulletin, volume XVII, Number 11, November 1953. Modules of the type described comprise a plurality of congruently stacked, insulating panels termed "wafers" which carry the electronic components. The wafers are typically interconnected and supported in spaced relation by a plurality of conductors attached to the edges of the wafers and symmetrically surrounding them. These conductors are termed module riser conductors or module riser wires. In the manufacture of modules of the type described it has heretofore been a problem to efficiently cut the riser wires to size and in desired predetermined connection patterns.

It is therefore an object of the invention to provide an improved apparatus for cutting module riser wires.

A still further object of the invention is to provide an improved apparatus for cutting module riser wires wherein any combination of cuts may be simultaneously effected.

In accordance with the present invention there is provided an apparatus for cutting module riser wires. The apparatus comprises a mounting surface and a table slidably mounted thereon. A plurality of cutter members are adjacent the table and are slidable with respect to the mounting surface. Means coupled to the table are movable laterally relative to the cutter members for selectively engaging the cutter members and the table. A pair of eccentric cams are coupled to the mounting surface and axially disposed adjacent opposite ends of the table for moving the table and the engaged cutter members along an axis perpendicular to the axis of rotation of the cams.

For a better understanding of the present invention, together with other and further objects thereof, reference is made to the following description taken in connection with the accompanying drawings and its scope will be pointed out in the appended claims.

*Description*

Figure 1:
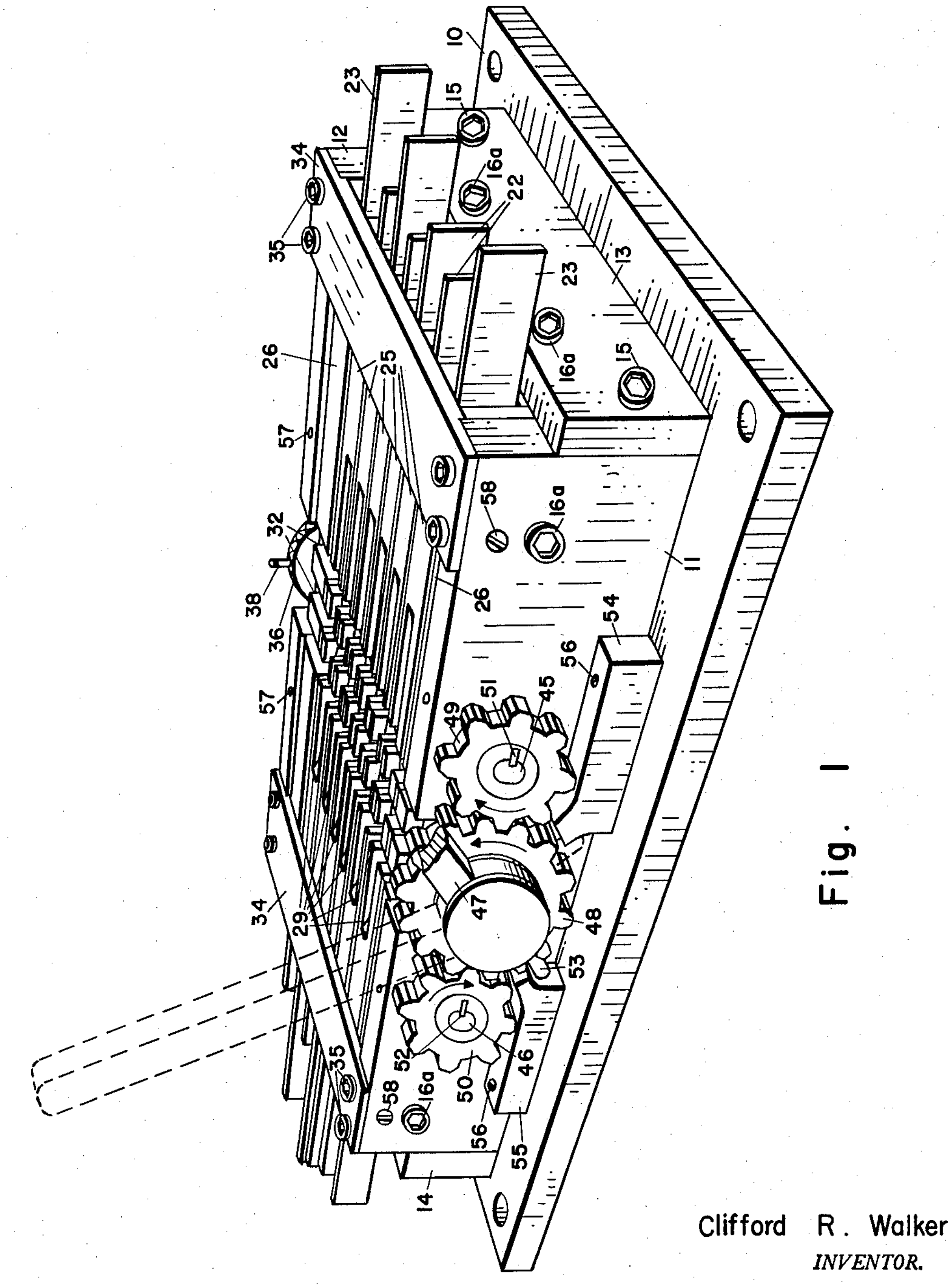
Fig. 1 is a side view in perspective of an apparatus for cutting module riser wires embodying the present invention.

Referring now to the drawings and with particular reference to Figs. 1–6, inclusive, there is here illustrated an apparatus for cutting module riser wires. The apparatus comprises a baseplate 10 to which side members 11 and 12 are secured, for example by means of bolts (not shown). End members 13 and 14 are secured to the side members 11 and 12 with, for example, bolts 15. A supporting block member 16, more clearly viewed in Figs. 3, 4, 5 and 6, provides a mounting surface 17 on which a table 18 is slidably mounted. The block member 16 is supported, as shown particularly in Figs. 4 and 6, in a pair of channels 19 and 20 formed in side members 11 and 12, respectively. Bolts 16*a* secure the block member 16 to the side members 11 and 12 and the end members 13 and 14. A plurality of tapered, key members 21 and a pair of tapered end key members 24, more visible in Figs. 2, 3, 4 and 5, are affixed to and extend from the table 18, thereby adapting the table 18 selectively to engage a plurality of toothed cutter members 22 and 23. The cutter members 22 and 23 are supported adjacent and above the table 18 by spacer elements 33 on which they ride so as to be slidable with respect to the mounting surface 17. As shown by means of the details provided in Fig. 4 the cutter members 22 and 23 are identical in structure. Tapered indentations 27 form teeth in the lower edge of cutter members 22 and 23 for meshing with the key members 21 and 24, respectively, whereby the cutter members and the table 18 may be engaged. The key members 21 and 24 and the indentations 27 are tapered as shown to preclude misalignment therebetween. The teeth of members 21 and 24 and the indentations 27 will not mesh if the cutter members are reversed. A plurality of cutter blades 28 extend from the upper edges of the members 22 and 23 at spaced intervals to be described in greater detail below. The cutter members 23 are continuously engaged to the key members 24 as will be apparent from the length of the members 24 as shown in detail in Fig. 5.

Figure 3:
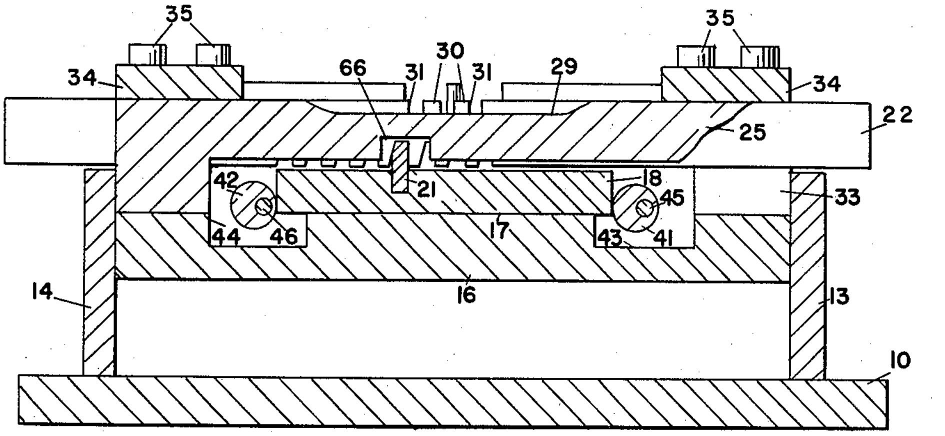
Fig. 3 is a sectional view of the apparatus as shown in Fig. 2 taken along the lines 3—3.
Figure 4:
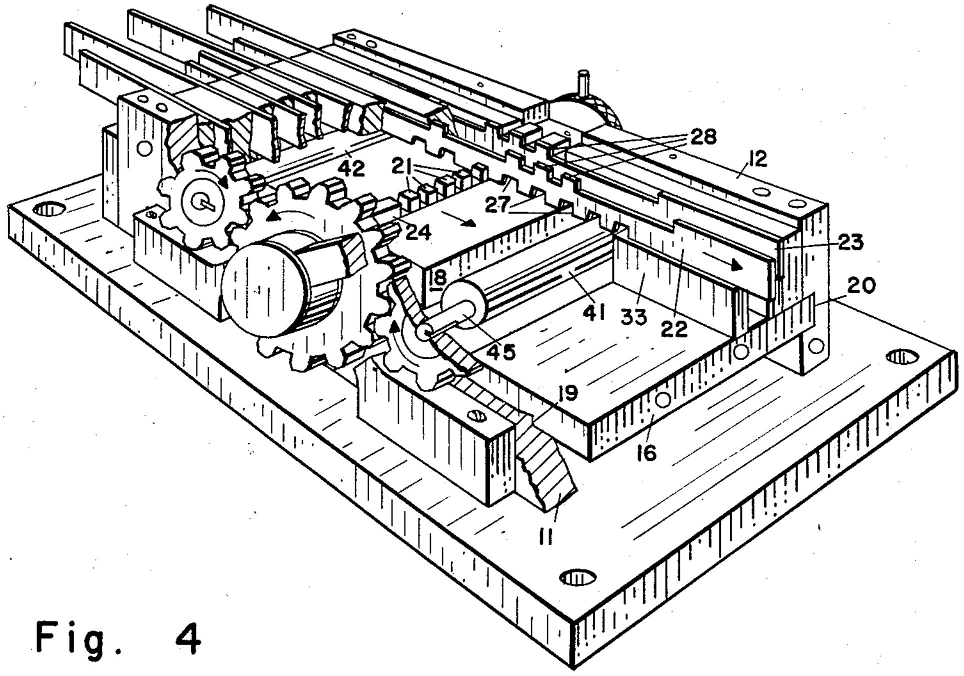
Fig. 4 is a partially fragmentary perspective view of one side of the apparatus in Fig. 1 illustrating an aspect of its structure.

A plurality of spacer members 25 are carried by the supporting block member 16 for laterally spacing the cuter members 22. A pair of spacer members 26 are disposed adjacent the cuter members 23 as shown particularly in Fig. 6. A rectangular groove 66, visible in Fig. 3, is formed in each spacer member 25 and 26 to enable lateral and limited end motion of the key members 21 and 24 within the grooves, and consequently, lateral and limited end motion of the table 18. The spacer members 25 have slots 29 formed in the upper exposed surfaces thereof to receive module wafers. A plurality of grooves 31 and 32 are also formed in the top surfaces of the spacer members 25 and 26, respectively, to receive module riser wires attached to modules so that the wires may be cut in a predtermined connecting pattern. The slots 29 and grooves 31 formed in the spacer members 25 provide guide blades 30 to hold the module riser wires in place during the cutting operation. Spacer elements 33 are disposed between adjacent spacer members 25 and 26 below the level of the cutter members 22 and 23 as illustrated more specifically in Fig. 6. The spacer elements 33 are, for example, approximately .001 inch wider than the cuter members to facilitate their free movement along the valleys formed by adjacent spacer members 25 and 26.

Figure 2:
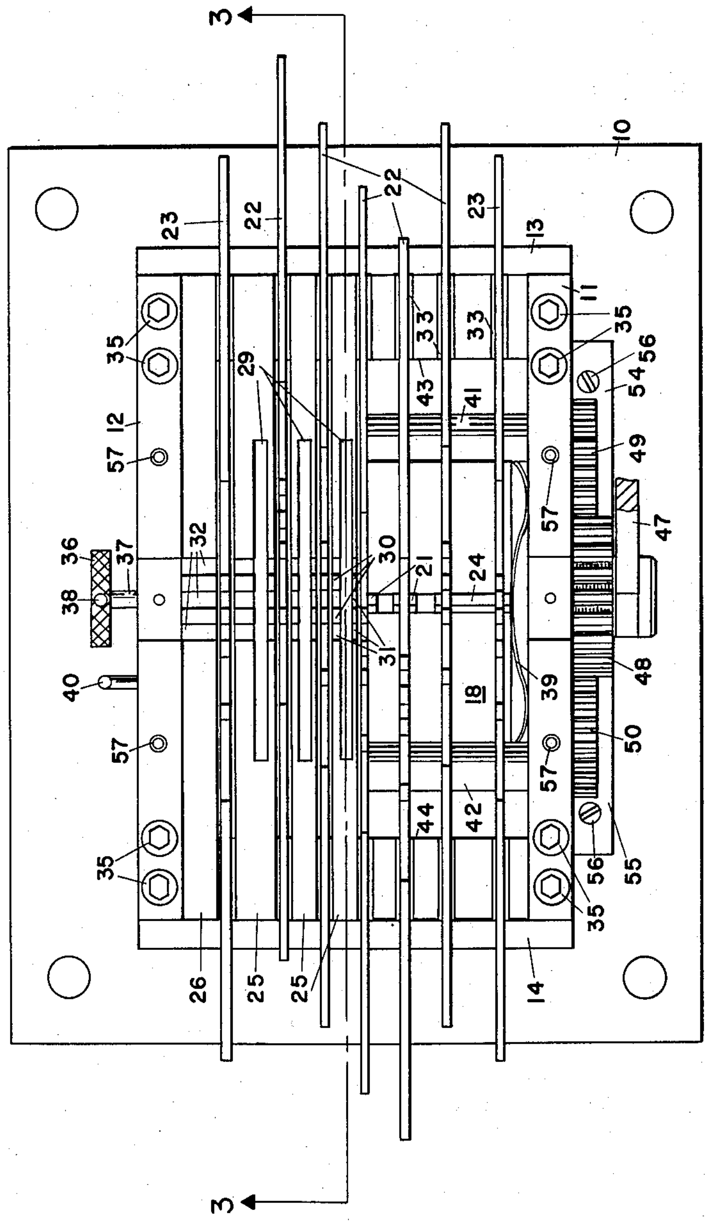
Fig. 2 is a plan view of the top of the apparatus in Fig. 1 with some spacer members removed.

A pair of cap members 34 are secured to the tops of the side members 11 and 12 with bolts 35 to secure the spacer members 25 and 26 and constrain the cutter members to axial motion relative to the mounting surface 17. As more clearly represented in Figs. 2 and 5, a knurled knob 36 is secured to a shaft 37 which is affixed to the table 18 through an aperture, not shown, in the side member 12. The aperture in the member 12 is enlarged relative to the shaft 37 to enable limited motion of the table 18 along an axis—preferably normal to the axis of motion of the cutter members 22 and 23. The knob 36 and shaft 37 provide means coupled to the table 18 and movable therewith relative to the cutter members 22 and 23 for selectively engaging the cutter members 22 and the table 18. The knob 36 is rotatable to enable locking pin 38, affixed thereto, to engage a hooked, locking pin 40, most clearly shown in Fig. 5, as affixed to the member 12. A flat spring 39, visible in Figs. 2 and 5, provides a resilient means coupling the table and the cutter members 22 for maintaining the members normally engaged.

A pair of eccentrically mounted cams 41 and 42 provide actuator means coupled to, that is, in controlling contact with the table 18 for moving the table and the engaged cutter members 22 and 23 along the mounting surface 17 in a direction parallel to the side members 11 and 12. Channels 43 and 44, visible in Fig. 3, formed in the supporting block member 16 enable the cams 41 and 42 to rotate freely. The cams 41 and 42 are eccentrically mounted on shafts 45 and 46, respectively, extending through orifices, not shown, in side members 11 and 12. A rotatable lever 47 is affixed to a drive gear 48 and a shaft not shown carried by the side member 11. The drive gear 48 is coupled to a pair of driven gears 49 and 50 which are keyed to and rotate shafts 45 and 46, respectively. The shafts 45 and 46 and gears 49 and 50 are grooved to enable the insertion of keys 51 and 52 to secure the gears to the shaft in a well-known manner. The ratio between the drive gear 48 and the driven gears 49 and 50 is preferably 2-to-1. A stop member 53 is affixed to the drive gear 48 to limit its motion in combination with a pair of gear stop guides 54 and 55. The guides 54 and 55 are secured to the mounting plate 10 with bolts 56. Oiling holes 57, visible in Figs. 1 and 2, are formed in the tops of the side members 11 and 12 to communicate with the shafts 45 and 46. A plurality of set screws 58 are disposed in threaded holes in the side members 11 and 12 for vernier adjustment of the lateral positions of the spacer members 25 and 26 and cutter members 22 and 23.

Figures 5, 6:
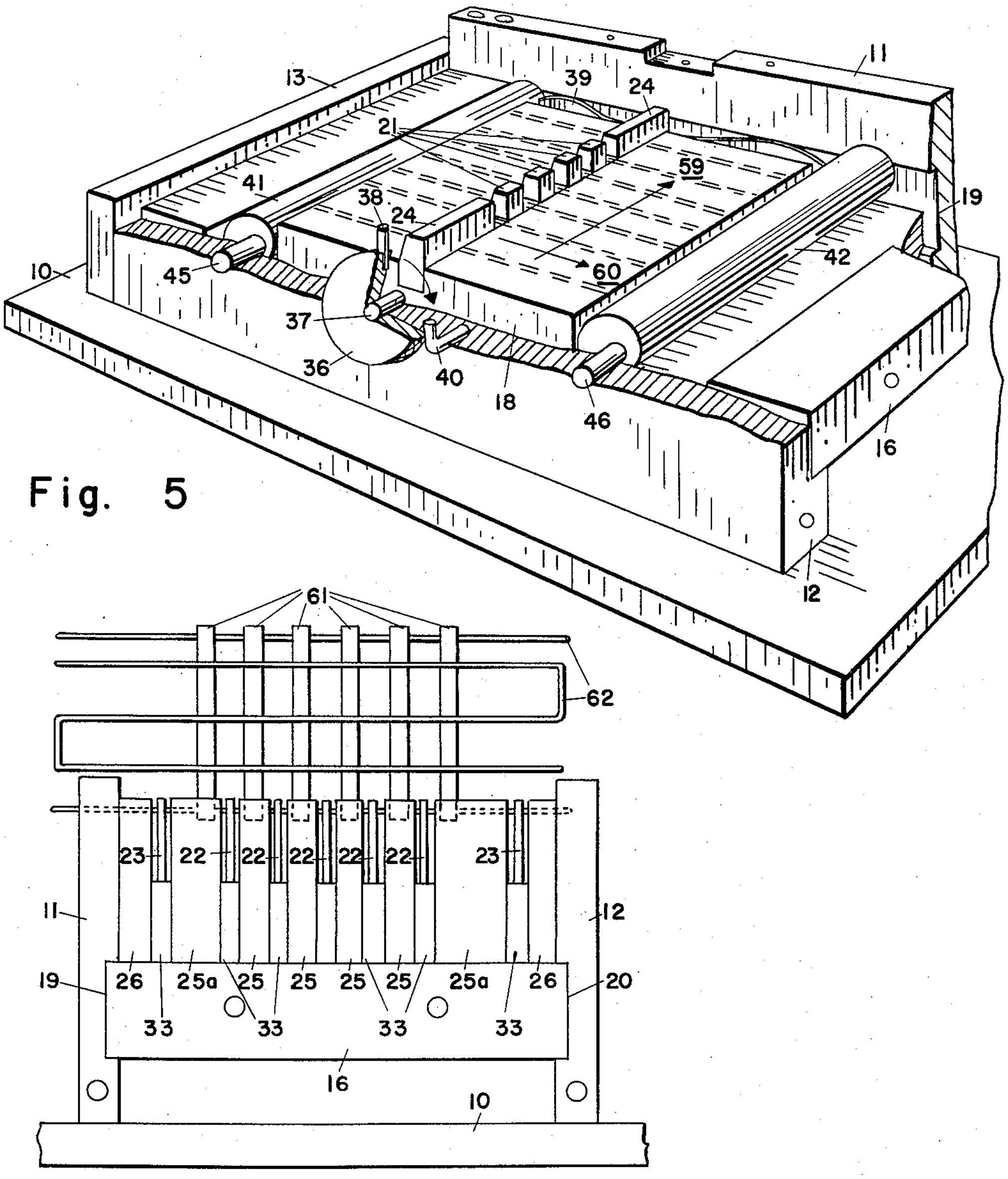
Fig. 5 is a partially fragmentary view, in perspective, of the other side of the apparatus in Fig. 4, employing one part of the apparatus.
Fig. 6 is a front end view of a part of the apparatus in Fig. 1.

In Fig. 5 a reversed, side, perspective view of a detail of the apparatus in Fig. 1 is illustrated with the knob 36 predominant. The motion of the table 18 for engaging and disengaging the keys 21 from the cutter members 22, not shown, is along an axis 59 normal to the direction 60 of motion imparted by the eccentric cams 41 and 42. It will be apparent that the cams 41 and 42 are identical to enable either cam to actuate the motion of the table. Both cams 41 and 42 rotate in the same direction as determined by the drive gear 48.

In Fig. 6 a module having a plurality of wafers 61 interconnected and supported by module riser wires 62 is shown inserted in the apparatus preparatory to cutting. Here the dispositions of spacer members 25 and 26 and spacer elements 33 are more clearly delineated and it will be seen that the cutter members 22 and 23 are so spaced as to facilitate free motion thereof. The members 22 are equally spaced to provide intramodule disconnections of the riser wires where needed, while the members 23 are so spaced by spacer members 25*a* as to cut the riser wires extending from the module to a suitable consistent length.

Figure 9:
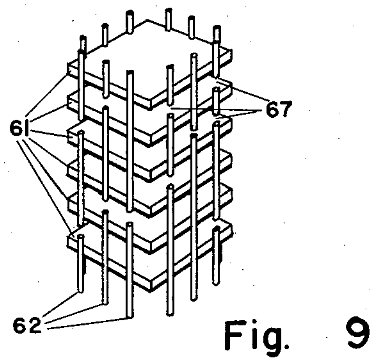
Fig. 9 is a perspective view of a module as manufacturtd in accordance with the present invention.

In Fig. 9 a completed module is shown illustrating a particular connection configuration. The wire loops interconnecting the riser wires 62 are here removed and disconnections or open circuits 67 have been introduced where appropriate. It will be apparent that the connection on the right side of the module differs markedly from that of the left.

*Operation*

The cutting operation is performed by inserting modules so that the wafers are received in the slots 29 and the riser wires are received in the grooves 31 of the spacer members 25. When the lever 47 is rotated counter-clockwise, the cutter members 22 and 23 move to the right, in Fig. 1, to shear off a length of wire equal to the width of the cutter blades 28. The lever 47 is then rotated clockwise to return it to its normal position and remove the cutter blades from interfering in the grooves 31 of the spacer members 25. It will be apparent that when the lever 47 is rotated counter-clockwise, the drive gear 48 is likewise rotated counter-clockwise to cause the driven gears 49 and 50 to rotate clockwise. The drive gears cause the eccentric cams to rotate clockwise, as more clearly seen from Fig. 3, whereby cam 42 moves the table to the right since the table is engaged to the cutter members 22 and 23 through the key members 21 and 24. The cutter members accordingly move to the right to shear off lengths of module riser wires substantially equal to the width of cutter blades 28. When the lever is rotated clockwise, the cam members are rotated counter-clockwise, and the eccentric cam 41 causes the table 18 to be slid along the mounting surface 17 to the left. The length of travel of the cutter members 22 and 23 is so chosen that the cutter blades 28 move past adjacent grooves 31 in the spacer members 25 to overlap the next adjacent spacer blades 30 and insure a complete riser wire cut. When the cutter members are reversed in direction, the cut pieces of wire are ejected from the channel formed by adjacent spacer members to facilitate their ready removal.

Selective engagement of the cutter members 22 and 23 and the table key members 21 and 24 and removal of the cutter members are enabled by the limited, lateral, end motion of the table 17 operating in opposition to the spring member 39. The spring exerts a lateral force against the table 17 to maintain the key members 21 inserted in the actuator slots 27 of the cutter members 22. When the knob 36 is pressed toward the table in the direction 59 as shown, for example, in Fig. 5, the key members 21 become disengaged from the cutter blades 22. At that point, the blades may be removed. The particular cutting pattern desired is obtained by engaging one of the key members 21 with one of the eight actuator slots or tapered indentations 27 in the cutter members 22. As schematically indicated in Fig. 6, and discussed in further detail below, a particular cutting pattern may be obtained by selectively engaging one of the indentations $I_1$ through $I_8$ to cut any combination of the wires.

Figure 7:
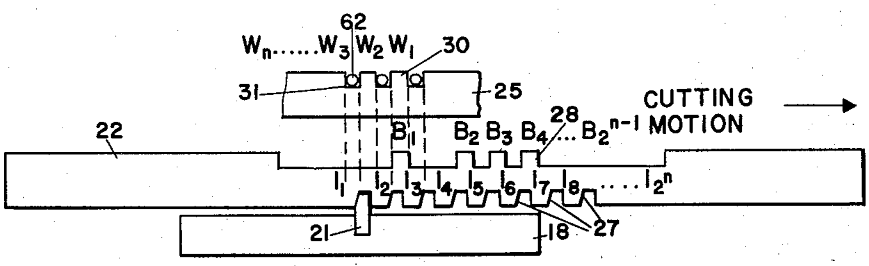
Fig. 7 is a partially fragmentary, schematic view of a part of the apparatus in Fig. 1 illustrating an aspect of its operation.

Referring now to Fig. 7, it will be apparent that the present invention is applicable to a system of more than the three riser wires illustrated. Thus, the cutter blades 28, the riser wires 62 and the indentations 27 as illustrated are indicated for a system of N wires. There is, therefore, here schematically illustrated the relative positions of the riser wires 62 indicated as $W_1$, $W_2$, $W_3$, . . . , $W_n$, cutter blades 28 as $B_1$, $B_2$, $B_3$, . . . , $B_{2n-1}$, cutter indentations 27 as $I_1$, $I_2$, $I_3$, . . . , $I_{2n}$ and table 18 and key members 21 for a system of three wires. The dispositions of the cutter blades 28 and wires 62, corresponding with the insertion of key member 21 into each indentation 27 in the cutter member 22 is tabulated. With reference to Figs. 2 and 5 the positions of the cutter members 22 relative to the key member 21 is changed by pressing the knob 36 forward to move the table 18 against the pressure of the spring 39. To maintain the cutter members 22 disengaged from the table, the knob 36 is rotated until the pin 38 engages the hooked, locking pin 40. The cutter members 22 may then be freely moved axially to assume any of the relative positions tabulated in Fig. 7. For a given connection pattern a key may be fashioned to set up the cutter members 22 simultaneously to provide the desired configuration.

It will be apparent from the above description that the apparatus for cutting module riser wires, in combination with the riser wires, is in effect a switching system while the embodiment illustrated necessarily effects an all-or-none switching action, i.e., permanently open circuits or permanently closed circuits. The cut wire portions are effectively switching elements and the cutter blades are effectively actuator controls for the switching elements. The module riser wires thus provide a switching system which comprises a matrix M rows by N columns of switching elements. Likewise, each cutter member comprises a group of actuator controls. For the M rows of switching elements, M groups of actuator controls are required. It can be shown by conventional mathematical inductive reasoning that with N switching elements, a total of $2^n$ combinations of switching elements are possible and that substantially less than $2^n$, in the order of $2^{n-1}$, actuator controls are required for simultaneously controlling any combination of switching elements. The structure described and illustrated for selectively engaging the cutter members 22 and the table 18 provides means enabling selective coupling of the actuator controls and the switching elements for simultaneously controlling any combination of switching elements.

Figure 8:
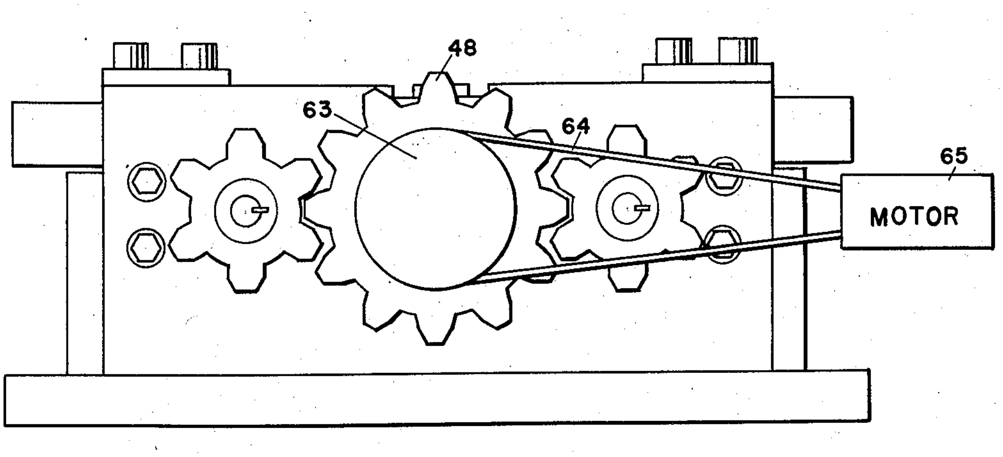
Fig. 8 is a side view of a modification of the apparatus of Fig. 1.

In Fig. 8 there is illustrated a side view of a modification of the apparatus for cutting module riser wires in Fig. 1. Here, like parts are identified by like numbers. In place of the lever 47 as shown in Fig. 1. a pulley 63 is affixed to the drive gear 48 and rotated by a belt 64 driven by a suitable motor 65. When the drive gear 48 is continuously rotated in the same direction the table 18 and, hence, the cutting members 22 and 23 are reciprocally shuttled at the rate so chosen as to permit ready insertion and removal of modules from the apparatus.

While applicant does not intend to be limited to any particularly shape or size of parts in the embodiment of the invention just described, there follows a set of sizes and dimensions for the more important elements which have been found to be particularly suitable for an apparatus for cutting module riser wires of the type represented in Figs. 1–6, inclusive.

Module wafers 61 are approximately ⅞ of an inch square by $\frac{1}{16}$ of an inch thick and formed of ceramic. The separation between wafers center-to-center is approximately $\frac{3}{16}$ of an inch. The separation between riser wires center-to-center is $\frac{7}{32}$ of an inch. Cutter members 22 and 23 are $\frac{1}{32}$ of an inch thick by ½ of an inch wide by 6¾ inches long. The cutter blades 28 are ⅛ of an inch wide and $\frac{9}{100}$ of an inch high. The distance of the notch adjacent the blade $B_4$ on the right side is 1 inch. The distance between adjacent blades $B_1$ and $B_2$ is ⅜ of an inch and the notch adjacent the blade $B_1$ on the left side is ⅞ of an inch. The spacer members 25 are $\frac{5}{32}$ of an inch wide and the slots 29 and 30 are $\frac{3}{32}$ of an inch wide and greater than 1 inch long. The indentations 27 are $\frac{7}{32}$ of an inch deep on the untapered side and have one side tapered 15°. They are spaced apart $\frac{7}{32}$ of an inch from leading edge to leading edge. The widest opening of the indentations is $\frac{5}{32}$ of an inch. The untapered side of the indentation $I_8$, as shown in Fig. 7, is displaced to the right of the right side of the cutter blade $B_4$ by $\frac{5}{32}$ of an inch. The groove 66 in the spacer member is ⅜ of an inch long by $\frac{7}{32}$ of an inch high. The right side of the groove 66 is displaced to the left of the left side of the right spacer blade 30 by $\frac{3}{16}$ of an inch. When the table 18 is in its initial position, the untapered side of the key member 21 is displaced to the left of the left side of the left groove 31 by $\frac{1}{25}$ of an inch.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed:

1. An apparatus for cutting module riser wires, comprising: a mounting surface; a table slidably mounted on said surface; a plurality of cutter members adjacent said table and slidable with respect to said mounting surface; means coupled to said table and movable laterally relative to said cutter members for selectively engaging said cutter members and said table; and a pair of eccentric cams coupled to said mounting surface and axially disposed adjacent opposite ends of said table for moving said table and said engaged cutter members along an axis perpendicular to the axis of rotation of said cams.

2. An apparatus for cutting spaced, module, riser wires, comprising: a mounting surface; a table slidably mounted on said surface; a plurality of cutter members adjacent said table and slidable with respect to said mounting surface, said cutter members having a plurality of spaced, cutter blades to permit the insertion of module riser wires therebetween; means coupled to said table and movable laterally relative to said cutter members for selectively engaging said cutter members and said table; and actuator means coupled to said table for moving said table and said engaged cutter members along an axis to cut said module riser wires.

3. An apparatus for cutting regularly spaced module riser wires, comprising: a mounting surface; a table slidably mounted on said surface; a plurality of cutter members adjacent said table and slidable with respect to said mounting surface, each of said cutter members having a plurality of cutter blades spaced an integral number of spacing units apart with said units corresponding to said riser wire spacings, said blades being adapted to enable selective coupling of said cutter blades and said riser wires for simultaneously cutting any combination of said riser wires; means coupled to said table and movable laterally relative to said cutter members for selectively engaging said cutter members and said table; and actuator means coupled to said table for moving said table and said engaged cutter members along an axis to cut module riser wires.

4. An apparatus for cutting module riser wires, comprising: a mounting surface; a table slidably mounted on said surface; a plurality of cutter members adjacent said table and slidable with respect to said mounting surface; means coupled to said table and movable relative to said cutter members for selectively engaging said cutter members and said table; resilient means coupling said table and said cutter members for maintaining said cutter members normally engaged to said table; and actuator means coupled to said table for moving said table and said engaged cutter members along an axis to cut module riser wires.

5. A cutter member for regularly spaced, module riser wires, comprising: a thin, elongated, planar, metallic body; a series of regularly spaced actuator elements provided with said body, the spacing between adjacent elements corresponding with the spacing between said riser wires; and a plurality of cutter blades affixed to said body and spaced apart an integral number of spacing units, each of said units corresponding with said riser wire spacings whereby a unique wire cutting pattern is provided by actuating each actuator element when said cutter member is utilized in association with said module riser wires.

6. A cutting member for three regularly spaced, module riser wires, comprising: a thin, elongated, planar, metallic body; a series of eight actuator elements regularly spaced at intervals corresponding with said riser wire spacings; and three regularly spaced cutter blades affixed to said body and a fourth cutter blade linearly aligned with said three cutter blades and spaced apart from said three cutter blades by an interval corresponding with a cutter blade and twice the spacing between any adjacent two of said three cutter blades, the spacing between any adjacent two of said three cutter blades corresponding with said riser wire spacings.

References Cited in the file of this patent

UNITED STATES PATENTS

| | | |
|---|---|---|
| 285,133 | Humphrey | Sept. 18, 1883 |
| 906,572 | Smith | Dec. 15, 1908 |
| 2,711,818 | Ruttkay | June 28, 1955 |